US008108596B2

(12) United States Patent
Aldworth et al.

(10) Patent No.: US 8,108,596 B2
(45) Date of Patent: Jan. 31, 2012

(54) MEMORY CONTROLLER ADDRESS MAPPING SCHEME

(75) Inventors: Peter James Aldworth, Cambridge (GB); Daren Croxford, Burwell (GB)

(73) Assignee: ARM Limited, Cambridge (GB)

( * ) Notice: Subject to any disclaimer, the term of this patent is extended or adjusted under 35 U.S.C. 154(b) by 550 days.

(21) Appl. No.: 12/309,762

(22) PCT Filed: Aug. 3, 2006

(86) PCT No.: PCT/GB2006/002910
§ 371 (c)(1),
(2), (4) Date: Jan. 29, 2009

(87) PCT Pub. No.: WO2008/015370
PCT Pub. Date: Feb. 7, 2008

(65) Prior Publication Data
US 2009/0319718 A1 Dec. 24, 2009

(51) Int. Cl.
*G06F 13/00* (2006.01)
(52) U.S. Cl. .................. 711/105; 711/E12.003
(58) Field of Classification Search .............. None
See application file for complete search history.

(56) References Cited

FOREIGN PATENT DOCUMENTS
EP 1 191 445 3/2002

OTHER PUBLICATIONS
International Search Report for PCT/GB2006/002910, mailed Jun. 25, 2007.
Written Opinion of the International Searching Authority for PCT/GB2006/002910, mailed Jun. 25, 2007.

*Primary Examiner* — Pierre-Michel Bataille
*Assistant Examiner* — Sean D Rossiter
(74) *Attorney, Agent, or Firm* — Nixon & Vanderhye, P.C.

(57) ABSTRACT

A data processing system is provided with a memory controller (130) converting memory addresses (170) into selecting signals (120) for a memory device (100). The mapping between memory addresses and selecting signals is provided by mapping logic (140) within the memory device. The configuration of the mapping logic, also known as a mapping scheme, is defined by data stored in mapping specifying data storage (150), which may be altered by operating system software or application software (160) running on the system. Altering this configuration may be as a result of signals received from a monitoring unit (135) which monitors the efficiency with which the current mapping scheme is accessing data stored in the memory device. More than one mapping scheme may be used within a single memory device.

68 Claims, 5 Drawing Sheets

Figure 1:
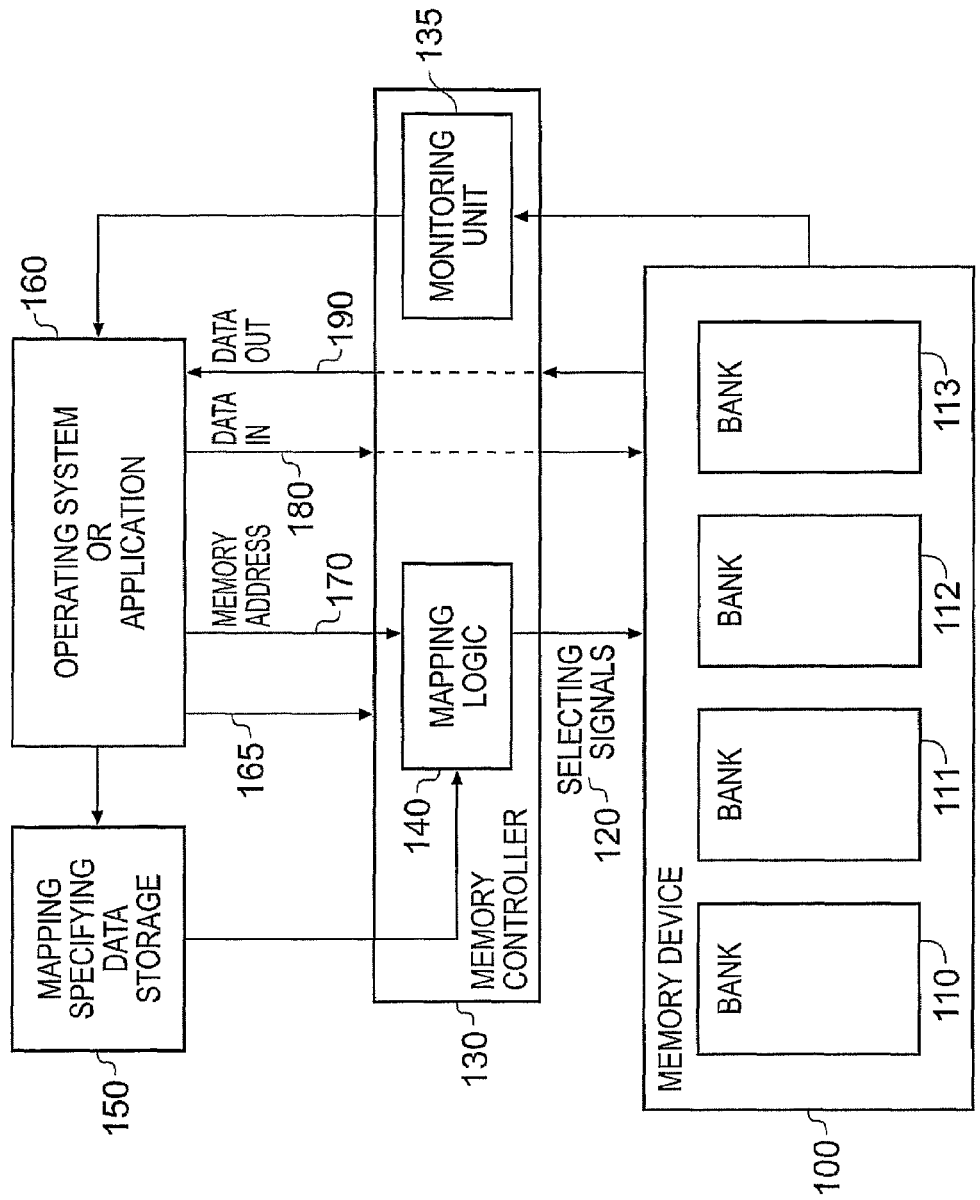

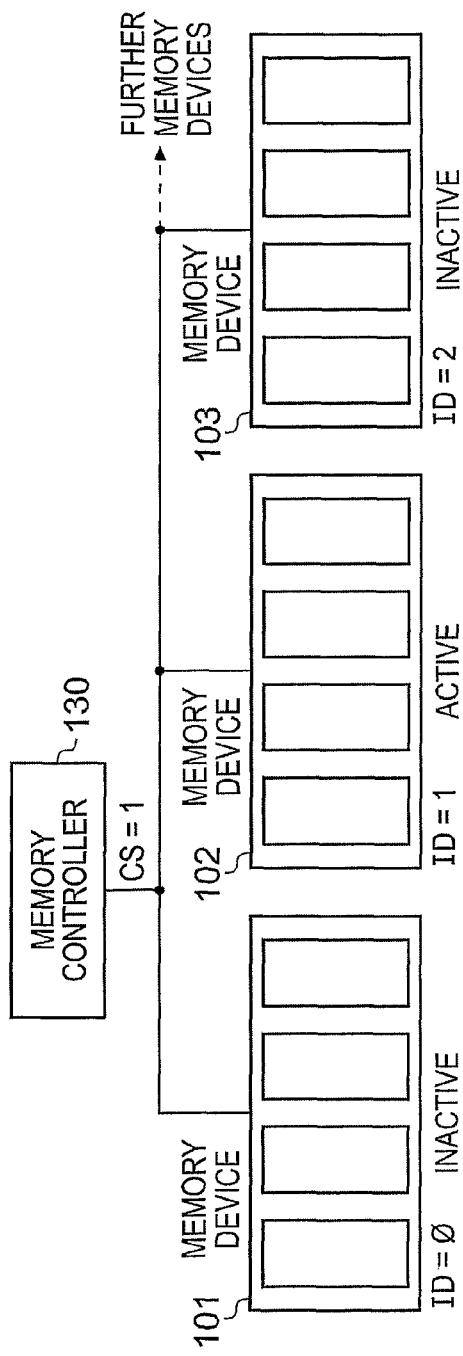
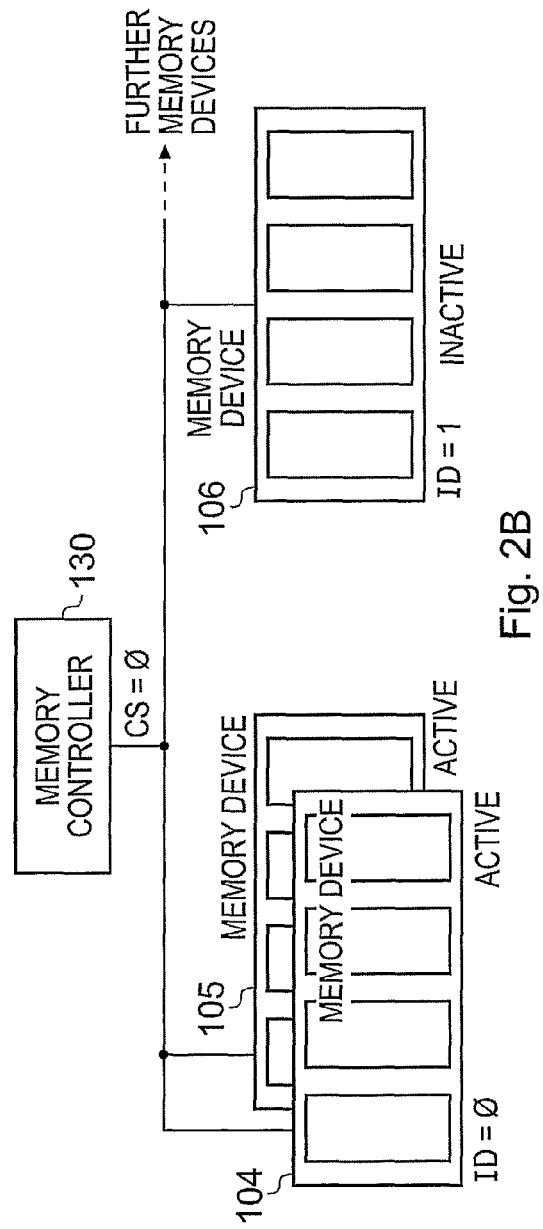
Fig. 2A
Fig. 2B

MEMORY CONTROLLER ADDRESS MAPPING SCHEME

This application is the U.S. national phase of International Application No. PCT/GB2006/002910, filed 3 Aug. 2006 which designated the US the entire contents of which are hereby incorporated by reference.

The present invention relates to the field of data processing. More particularly the present invention relates to the generation of signals for accessing a memory.

In a memory controller which connects a master device to a SDRAM device, memory addresses are converted into device address signals according to known address mapping schemes. These device address signals include bank, row and column address signals. Various mapping schemes are known and each has their own advantages and disadvantages depending on how the memory device is used.

Common address mapping schemes are "Bank, Row, Column (B-R-C)", "Row, Bank, Column (R-B-C)" and "Bank, Row Low, Column Low, Row High, Column High (B-RL-CL-RH-CH)". It is known that SDRAM power consumption and access latency are strongly affected by whether an access occurs to an activated row or to a row which is not activated. The mapping scheme chosen determines how efficiently a particular type of access pattern takes advantage of activated rows in the SDRAM.

The B-R-C is the most commonly used address mapping scheme. When used for masters with strong temporal and spatial access locality for low order address bits it gives good average memory latency, memory bandwidth and memory device power consumption. Using this scheme each bank of memory controlled by a memory controller can in principle be allocated to a different master and the master transactions can then be performed independently of one another, without, for example, inefficiencies arising due to two masters accessing the same memory bank with different access patterns.

The R-B-C mapping scheme effectively allows a longer row length which is useful for systems that stream large runs of sequentially addressed data. The R-B-C scheme requires that adjacent bank use the R-B-C scheme to prevent aliasing. For a four bank memory device complexity is minmised when the R-B-C scheme is used in banks 0 to 1, 2 to 3 or banks 0 to 3 for a region of memory.

The B-RL-CL-RH-CH mapping scheme has a shorter row and column length. This scheme is used for graphics applications such as MPEG video, graphics or digital signal processing, where data on the video lines above and below the current video line need to be accessed together, e.g. for decoding together as a macroblock.

In the prior art a fixed mapping scheme is chosen for an entire memory device on a per chip or per device basis. However, this restriction to a particular mapping scheme may result in performance disadvantages. For example, if an SDRAM memory device configured to use the B-RL-CL-RH-CH mapping scheme is also used for data streaming purposes.

Memory controllers have been developed that allow different address mapping schemes to be used with different SDRAM memory devices connected to a single memory controller. These mapping schemes can be chosen to maximise system performance, depending on the foreseen usage of each SDRAM memory device, but the system designer must commit each SDRAM memory device to a particular type of purpose and flexibility is lost.

Furthermore, the contemporary trend is for a system to use a single, large memory device rather than a number of smaller memory devices, in order to reduce power consumption, cost and size. With a single large memory device it is not possible to rely on having several devices in order to provide alternative mappings. Several different applications may share memory regions within a single device, with conflicting preferences for the optimal mapping scheme for that region.

Viewed from one aspect the present invention provides apparatus for processing data comprising:

a memory having one or more banks, each bank having an array of memory cells including a plurality of rows of memory cells and a plurality of columns of memory cells; and a memory controller responsive to a memory access request specifying a memory address to generate at least a row selecting signal, a column selecting signal output to said memory and a chip select signal; wherein said memory controller includes mapping logic responsive to mapping specifying data to apply a programmable mapping between at least some bits of said memory address and respective bits of at least said row selecting signal and said column selecting signal, such that row selecting bits of said memory address that form said row selecting signal and column selecting bits of said memory address that form part of said column selecting signal are selected from said memory address in dependence upon said mapping specifying data, said memory controller using different mappings for at least two portions of said memory having a common chip select signal.

The invention brings advantageous flexibility to systems with a memory device by providing mapping logic responsive to mapping specifying data to apply a programmable mapping between the bits of a memory address and the selecting signals applied to the memory device. Since the mapping is programmable, the system user, the system operating system or an application running on the system can dynamically alter the mapping applicable to a portion of the memory device, according to the use or intended use of that portion, in order to increase the efficiency with which that portion is accessed.

Whilst it will be appreciated that the mapping provided could take a wide variety of different forms, in one preferred embodiment, the programmable mapping is such that incrementing the memory address increments in order the column selecting signal, the row selecting signal and the bank selecting signal. This mapping is particularly useful if separate banks of a memory device need to be allocated to separate master devices.

In another preferred embodiment, the programmable mapping is such that incrementing the memory address increments in order the column selecting signal, the bank selecting signal and the row selecting signal. This mapping is particularly useful if a memory device is being used for streaming large runs of sequentially addressed data.

In yet another preferred embodiment, the programmable mapping is such that incrementing the memory address increments in order a low order portion of the column selecting signal, a low order portion of the row selecting signal, a high order portion of the column selecting signal, a high order portion of the row selecting signal and the bank selecting signal. This arrangement is particularly useful when the low order portion of the column selecting signal and the low order portion of the row selecting signal have respective bit widths matching dimensions of two-dimensional blocks of data values stored within the memory. This allows a master device, such as an MPEG video decoder, to rapidly access video lines above and below the current video line, and hence operate more efficiently.

In a further preferred embodiment, the programmable mapping is programmed by operating system software or application software running on a system which includes the memory device. This advantageously enables the system to adapt the mapping scheme used according to its present or intended operation.

In a still further preferred embodiment, the invention includes a monitoring unit for monitoring the efficiency with which the memory device is being accessed. An indication from this monitoring unit may be passed back to either the operating system or an application, which in turn may alter the programmable mapping in order to improve the efficiency with which the memory device is accessed.

Whilst the present technique is applicable to a variety of different types of memory, in preferred embodiments the memory device is an SDRAM memory device or an embedded DRAM memory device.

Whilst the mapping specifying data can be stored in a wide variety of different ways and locations, in preferred embodiments the mapping specifying data is stored in a page table entry within a memory management unit, a configuration register, a memory protection unit or a dynamic memory controller.

Viewed from a second aspect the present invention provides apparatus for data processing comprising:

at least one memory device having one or more banks, each bank having an array of memory cells including a plurality of rows of memory cells and a plurality of columns of memory cells, distinct memory devices of said at least one memory device being mutually exclusively selectable to be an active memory device; and a memory controller coupled to said at least one memory device responsive to a memory access request to a memory address within said active memory device to generate at least a row selecting signal and a column selecting signal; wherein said memory controller maps between bits of said memory address and bits of said row selecting signal and said column selecting signal; and said memory controller uses different mappings for at least two portions within one of said at least one memory device.

In a preferred embodiment at least one of the mappings is programmable.

Viewed from a third aspect the present invention provides a method of processing data, said method comprising the step of:

accessing a memory having one or more banks, each bank having an array of memory cells including a plurality of rows of memory cells and a plurality of columns of memory cells, including the steps of:

in response to a memory access request specifying a memory address, generating in a memory controller at least a row selecting signal, a column selecting signal to be output to said memory and a chip select signal; wherein said generating includes applying a programmable mapping according to mapping specifying data between at least some bits of said memory address and respective bits of at least said row selecting signal and said column selecting signal, such that row selecting bits of said memory address that form said row selecting signal and column selecting bits of said memory address that form part of said column selecting signal are selected from said memory address in dependence upon said mapping specifying data, said mapping being different for at least two portions of said memory having a common chip select signal.

Viewed from a fourth aspect the present invention provides a method of data processing, said method comprising the steps of:

accessing at least one memory device having one or more banks, each bank having an array of memory cells including a plurality of rows of memory cells and a plurality of columns of memory cells; and exclusively selecting distinct memory devices of said at least one memory device to be an active memory device; including the steps of:

in response to a memory access request to a memory address within said active memory device, generating at least a row selecting signal and a column selecting signal;

mapping between bits of said memory address and bits of said row selecting signal and said column selecting signal; and using different mappings for at least two portions within one of said at least one memory device.

Viewed from a fifth aspect the present invention provides apparatus for processing data comprising:

memory means for storing data in one or more banks, each bank having an array of memory cells including a plurality of rows of memory cells and a plurality of columns of memory cells; and controller means for controlling said memory means responsive to a memory access request specifying a memory address to generate at least a row selecting signal, a column selecting signal output to said memory means and a chip select signal; wherein said controller means includes mapping means responsive to mapping specifying data for applying a programmable mapping between at least some bits of said memory address and respective bits of at least said row selecting signal and said column selecting signal, such that row selecting bits of said memory address that form said row selecting signal and column selecting bits of said memory address that form part of said column selecting signal are selected from said memory address in dependence upon said mapping specifying data, said memory controller using different mappings for at least two portions of said memory having a common chip select signal.

Viewed from a sixth aspect the present invention provides apparatus for data processing comprising:

at least one memory device means for storing data and having one or more banks, each bank having an array of memory cells including a plurality of rows of memory cells and a plurality of columns of memory cells, distinct memory devices of said at least one memory device being mutually exclusively selectable to be an active memory device means; and controller means for controlling coupled to said at least one memory device means and responsive to a memory access request to a memory address within said active memory device means for generating at least a row selecting signal and a column selecting signal; wherein said controller means maps between bits of said memory address and bits of said row selecting signal and said column selecting signal; and said controller means uses different mappings for at least two portions within one of said at least one memory device means.

Figure 3:
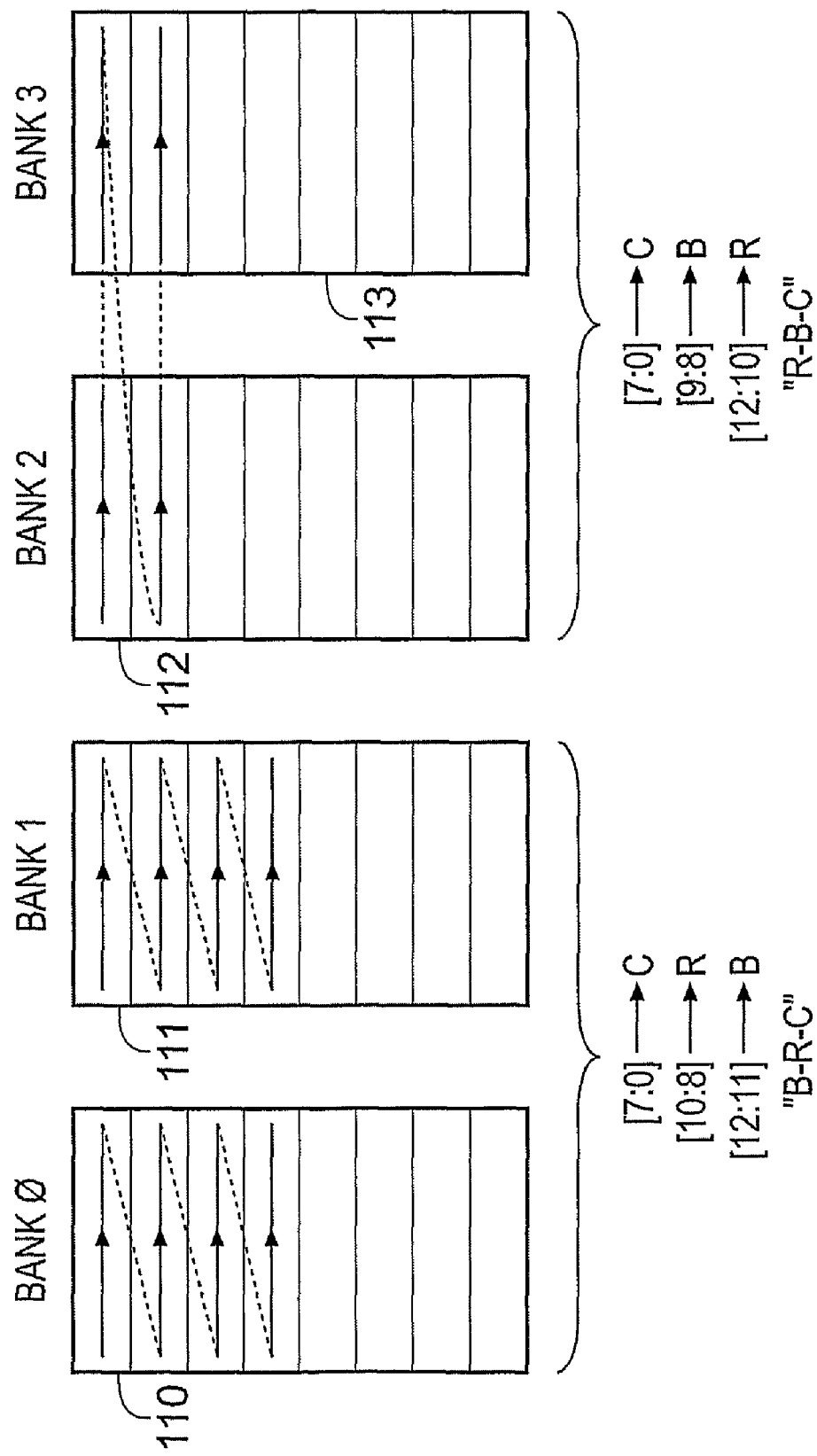
Figure 4:
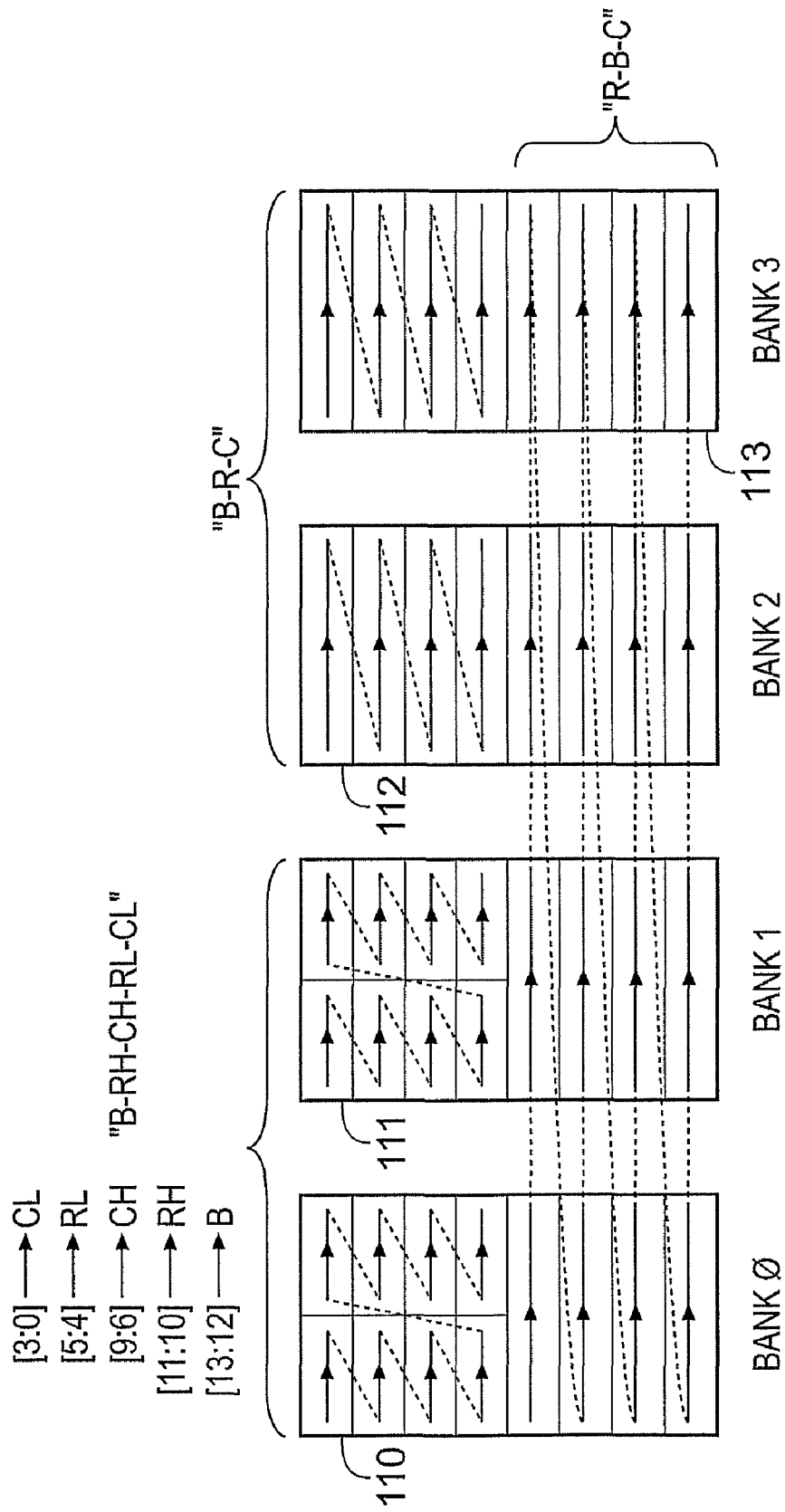
Figure 5:
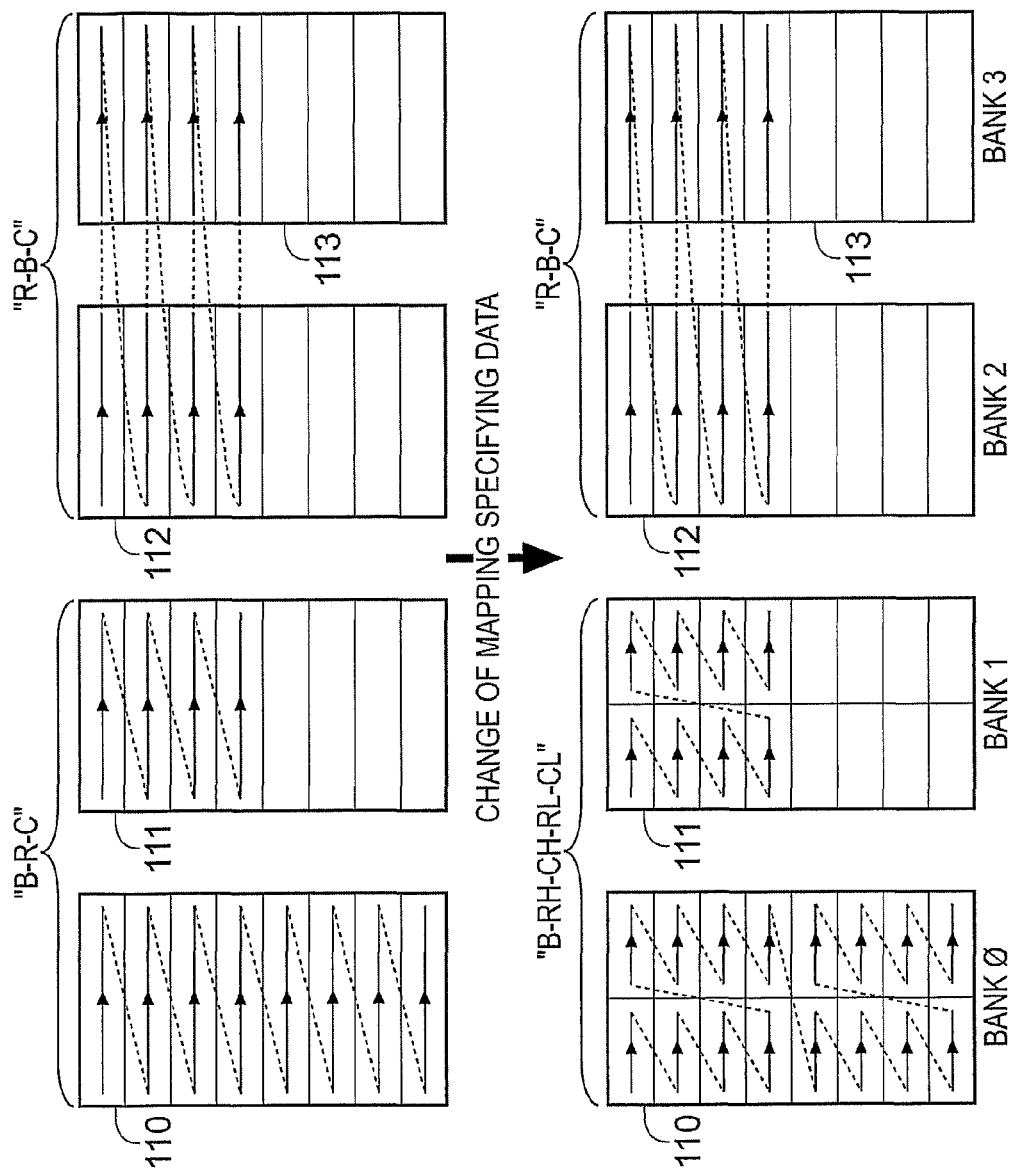

Embodiments of the invention will now be described, by way of example only, with reference to the accompanying drawings in which:

FIG. 1 schematically illustrates a data processing system including a memory controller according to one example of the present techniques;

FIG. 2A schematically illustrates a memory controller selecting the active memory device from a plurality of memory devices and FIG. 2B illustrates an alternative arrangement of plural memory devices being selected by a memory controller;

FIG. 3 schematically illustrates four banks of a memory device, where the first and second banks are mapped according to the B-R-C mapping scheme and the third and fourth banks are mapped according to the R-B-C mapping scheme;

FIG. 4 schematically illustrated four banks of a memory device, where the first and second banks are partially mapped according to the B-RL-CL-RH-CH mapping scheme and partially mapped according to the R-B-C scheme, and the third and fourth banks are partially mapped according to the B-RC mapping scheme and partially mapped according to the R-B-C scheme; and FIG. 5 schematically illustrates four banks of a memory device mapped according to one set of mapping schemes changing to a second set of mapping schemes.

FIG. 1 shows one example embodiment of the present techniques. A memory device 100 includes a plurality of banks 110, 111, 112, 113, each of which is subdivided into rows and columns. Data may be stored at particular locations in the memory device by specifying the bank, the row and the column. These selecting signals 120 are passed to the memory device from a memory controller 130. The memory controller 130 contains mapping logic 140 (which may be embodied as a collection of multiplexers controlled by the mapping specifying data) which converts a memory address into the selecting signals 120. The configuration of the mapping logic can be programmably (and dynamically) configured according to mapping specifying data. This mapping specifying data is stored in mapping specifying data storage 150, which may for example be a page table entry with in a memory management unit, a configuration register, memory protection unit or signal input The signal control link input (165) or configuration register could be located in the memory controller itself Providing mapping information in the page table entry, or memory protection unit, means that the mapping scheme is updated automatically when the memory is re-allocated by the OS. This scheme suits systems executing a complex feature OS.

Using the configuration register or control link scheme will be more straightforward to integrate into existing system hardware. These schemes require the configuration register to be manually written to update the mapping information. Due to this overhead it is likely that the mapping will be updated less frequently and there will be a higher memory granularity than the page table or memory protection schemes. This scheme suits systems executing simpler OS. Alternatively, this data may be stored in a dynamic memory controller within the memory controller itself. The mapping specifying data may be programmed by an operating system or application 160, either at system or application startup, or dynamically during further operation. The operating system or application 160 controls the operation of memory controller 130 by configuring the mapping specifying data stored in mapping specifying data storage 150.

Typically MMU's use page tables. A field in the page table entry is used to indicate the required address mapping. This information is provided from the MMU to the memory controller with each memory transaction. A MMU may perform virtual (VA) to physical (PA) address translation. The PA together with the address mapping scheme will be provided to the memory controller.

MPU based systems having additional fields indicating the required address mapping. This information is provided from the MPU to the memory controller with each memory transaction.

Systems that do not use MMU's or MPU's could locate the mapping specifying data storage in a separate component or internally in the memory controller.

The mapping logic 140 receives the address, information on the memory devices column length, row length, number of banks and data bus width. This information is used together with the mapping scheme selection to provide the encoded memory device address.

When a master wishes to access memory device 100, operating system or application 160 passes a memory address 170 to memory controller 130. When data is being written to memory device 100, memory address 170 is accompanied by the data to be written on data in-path 180. When data is to be read from the memory address 170 data is read out on data-out path 190. Although illustrated separately in this example data-in path 180 and data-out path 190 could be formed by a single bidirectional data bus.

The memory controller 130 may also include a monitoring unit 135 which monitors data accesses to memory device 100, and in particular the efficiency with which data is read from and written to memory device 100, according to the mapping scheme currently defined by mapping logic 140 for that portion of the memory. The monitoring unit examines the addresses of transactions for a region of memory. Only the region size number of PA address bits are required. These address bits are translated to the address mapping schemes that are being monitored.

The monitor keeps track of the previous open page for each scheme. A count is kept for the total number of transactions performed and the number of page hits for each scheme. If a different address mapping scheme to the scheme in use provides a significantly higher page hit rate this can be flagged and the appropriate action taken.

In the case of a design to automatically optimised the scheme used for a particular memory region on the fly; this could be performed by the block asserting an interrupt to the operating system or application 160 to flag an inefficient mapping scheme. The processor would copy the data for the region, switch the address mapping mode and then write the data back to the memory region. Alternatively the design could employ debug hardware to provide a trace of the information to software development tools. This would then allow a software developer to choose the most appropriate mapping schemes during software development.

The monitoring can be performed periodically to minimise power consumption. The monitoring unit could be external to the memory controller. The monitoring unit could be integrated into the memory controller thereby using the address mapping logic to both generate the required address and to help provide monitoring information. The illustrated example shows one memory device 100, but memory controller 130 may be configured to control several memory devices. In this case, the selecting signals 120 will not only consist of address and control signals for a memory device, but will also include a chip select signal specifying which of the memory devices under the control of memory controller 130 is currently active.

FIG. 2A schematically illustrates an arrangement where a single memory controller 130 controls the operation of several memory devices (three memory devices 101, 102, 103 are illustrated). In the example of FIG. 2A, the chip select (CS) signal is set to 1 so selecting memory device 102 (which has ID=1) as the active memory device and all other memory devices with different IDs as inactive. In other embodiments dedicated chip selecting signal lines and signals could be provided for each device.

FIG. 2B schematically illustrates an arrangement where two memory devices 104 and 105 operate in parallel, both sharing ID=0. Hence when the chip select signal is set to 0 both memory devices 104 and 105 are active and other memory devices, such as memory device 106 are inactive. Therefore device 104 and 105 could represent 16-bit wide data bus memory devices, and 106 represents a 32-bit wide memory device. Devices 104 and 105 are accessed together with the same chip select to provide 32-bits of data to a 32-bit memory controller. Whereas only device 106 is accessed to provide 32-bits of data.

FIG. 3 schematically illustrates four banks of a memory device. In this example the first two banks 110 and 111 are configured according to the B-R-C memory address mapping scheme, whereas the third and fourth banks 112 and 113 are configured according to the R-B-C memory address mapping scheme. The exemplary banks illustrated in FIG. 3 have 8 rows and 256 columns. Thus, in a memory address pertaining to the first two banks 110 and 111, the lowest eight bits of the address specify the column, the next higher three bits specify the row and the highest two bits specify the bank.

In a memory address pertaining to the third and fourth banks 112 and 113, the lowest eight bits correspond to the column the next higher two bits to the bank and the highest three bits specify the row.

Such an arrangement is advantageous in a situation where two master devices access the memory device containing these banks since bank 110 may be allocated to one master and bank 111 may be allocated to a second master. Inefficiencies are avoided due to the processors using different banks. If both processors used the same bank one processor would switch the active row away from the one needed by the other processor(s). The third and fourth banks 112 and 113 can be allocated to a further master device, such as an audio processor, which is continuously streaming audio data, or another type of processor performing a streaming data operation or random access to a localised region of memory which would benefit from the R-B-C mapping scheme allocated to these two banks.

FIG. 4 schematically illustrates four banks of a memory device which are still further subdivided into separate mapping schemes. In this example the first four rows of banks 110 and 111 are configured according to the B-RH-CH-RL-CL memory mapping scheme, such as is commonly used for graphics applications such as MPEG video. Thus, for memory addresses corresponding to the first four rows of these two banks, the lowest four bits of the address correspond to a low order portion of a column select signal (CL), the next higher two bits correspond to a low order portion of a row selecting signal (RL), the next four higher bits correspond to a high order portion of a column selecting signal (CH), the next higher two bits correspond to a high order portion of a row selecting signal (RH) and the highest two bits of the address correspond to a bank selecting signal. The first four rows of banks 112 and 113 are configured according to the B-R-C memory address mapping scheme. Finally, the last four rows of all four banks are configured according to the R-B-C memory address mapping scheme. Thus, in the example of FIG. 4, the memory device is configured such that quarter of the memory is set up for graphic application data storage, half the memory is set up for data streaming operations and quarter of the memory device is set up for general purpose multiprocessor usage.

FIG. 5 schematically illustrates the memory address mapping schemes of four banks of a memory device being dynamically adapted by an operating system or an application program. At first (the top half of FIG. 5), the mapping specifying data is such that mapping logic 140 is configured to use the B-R-C memory address mapping scheme for the first two banks 110 and 111 of the memory device and the R-B-C memory address mapping scheme for the third and fourth banks 112 and 113 of the memory device. It might then later prove to be desirable to alter the memory address mapping scheme used for a portion of the memory device, either due to changes in operating conditions or, for example, because a new application begins using or intends to begin using that portion of the memory device. The signal to initiate such a change of memory address mapping scheme could for example come from a new application initialising itself or alternatively could be the result of the monitoring unit 135 (which may for example count the frequency of changes in the active row) determining that a different memory address mapping scheme would make more efficient use of the memory device 100. In the example of FIG. 5, the mapping specifying data has been altered such that the mapping logic 140 is reconfigured to use the B-RH-CH-RL-CL memory address mapping scheme for the first two banks 110 and 111, and to maintain the same R-B-C memory address mapping scheme for the third and fourth banks 112 and 113 (lower half of FIG. 5). This could, for example, occur when in the first instance banks 110 and 111 have been being used as general purpose RAM space and banks 112 and 113 have been being used for streaming audio data. Then, later a graphics application is started whilst still streaming the audio data. Hence the first two banks 110 and 111 are adopted as the RAM space for the graphics application and the B-RH-CH-RL-CL memory address mapping scheme is adopted and the third and fourth banks 112 and 113 continue streaming the audio data using the R-B-C memory address mapping scheme. When such changes in mapping occur the memory has to be flushed of its existing content before being reloaded with new data according to the new mapping.

The invention claimed is:

1. Apparatus for processing data comprising:
a memory having one or more banks, each bank having an array of memory cells including a plurality of rows of memory cells and a plurality of columns of memory cells; and
a memory controller responsive to a memory access request specifying a memory address to generate at least a row selecting signal, a column selecting signal output to said memory and a chip select signal; wherein
said memory controller includes mapping logic responsive to mapping specifying data to apply a programmable mapping between at least some bits of said memory address and respective bits of at least said row selecting signal and said column selecting signal, such that row selecting bits of said memory address that form said row selecting signal and column selecting bits of said memory address that form part of said column selecting signal are selected from said memory address in dependence upon said mapping specifying data, said memory controller using different mappings for at least two portions of said memory having a common chip select signal.

2. An apparatus as claimed in claim 1, wherein said memory controller also generates a bank selecting signal.

3. An apparatus as claimed in claim 2, wherein said programmable mapping is such that incrementing said memory address increments in order said column selecting signal, said row selecting signal and said bank selecting signal.

4. An apparatus as claimed in claim 2, wherein said programmable mapping is such that incrementing said memory address increments in order said column selecting signal, said bank selecting signal and said row selecting signal.

5. An apparatus as claimed in claim 2, wherein said programmable mapping is such that incrementing said memory address increments in order a low order portion of said column selecting signal, a low order portion of said row selecting signal, a high order portion of said column selecting signal, a high order portion of said row selecting signal and said bank selecting signal.

6. An apparatus as claimed in claim 5, wherein said low order portion of said column selecting signal and said low order portion of said row selecting signal have respective bit widths matching dimensions of regularly sized blocks of data values stored within said memory.

7. An apparatus as claimed in claim 1, wherein said programmable mapping is programmed by operating system software controlling operation of said apparatus.

8. An apparatus as claimed in claim 1, wherein said programmable mapping is programmed by application software which accesses said memory.

9. An apparatus as claimed in claim 1, wherein said apparatus further comprises a monitoring unit operable to monitor the efficiency of said programmable mapping for accessing said memory.

10. An apparatus as claimed in claim 9, wherein said programmable mapping is altered in dependence upon an output of said monitoring unit, such that said efficiency increases.

11. An apparatus as claimed in claim 1, wherein said memory is a SDRAM.

12. An apparatus as claimed in claim 1, wherein said memory is an embedded DRAM.

13. An apparatus as claimed in claim 1, wherein said mapping specifying data is stored in a page table entry within a memory management unit.

14. An apparatus as claimed in claim 1, wherein said mapping specifying data is stored in a configuration register.

15. An apparatus as claimed in claim 1, wherein said mapping specifying data is stored in a memory protection unit.

16. An apparatus as claimed in claim 1, wherein said mapping specifying data is stored in said memory controller.

17. Apparatus for data processing comprising:
at least one memory device having one or more banks, each bank having an array of memory cells including a plurality of rows of memory cells and a plurality of columns of memory cells, distinct memory devices of said at least one memory device being mutually exclusively selectable to be an active memory device; and
a memory controller coupled to said at least one memory device responsive to a memory access request to a memory address within said active memory device to generate at least a row selecting signal and a column selecting signal; wherein
said memory controller maps between bits of said memory address and bits of said row selecting signal and said column selecting signal; and
said memory controller uses different mappings for at least two portions within one of said at least one memory device.

18. An apparatus as claimed in claim 17, wherein said memory controller also generates a bank selecting signal.

19. An apparatus as claimed in claim 18, wherein at least one of said mappings is such that incrementing said memory address increments in order said column selecting signal, said row selecting signal and said bank selecting signal.

20. An apparatus as claimed in claim 18, wherein at least one of said mappings is such that incrementing said memory address increments in order said column selecting signal, said bank selecting signal and said row selecting signal.

21. An apparatus as claimed in claim 18, wherein at least one of said mappings is such that incrementing said memory address increments in order a low order portion of said column selecting signal, a low order portion of said row selecting signal, a high order portion of said column selecting signal, a high order portion of said row selecting signal and said bank selecting signal.

22. An apparatus as claimed in claim 21, wherein said low order portion of said column selecting signal and said low order portion of said row selecting signal have respective bit widths matching dimensions of regularly sized blocks of data values stored within said memory.

23. An apparatus as claimed in claim 17, wherein said mappings are programmed by operating system software controlling operation of said apparatus.

24. An apparatus as claimed in claim 17, wherein said mappings are programmed by application software which accesses said memory.

25. An apparatus as claimed in claim 17, wherein said apparatus further comprises a monitoring unit operable to monitor the efficiency of said programmable mapping for accessing said memory.

26. An apparatus as claimed in claim 25, wherein said mappings are altered dependent on an output of said monitoring unit, such that said efficiency increases.

27. An apparatus as claimed in claim 17, wherein said memory is a SDRAM.

28. An apparatus as claimed in claim 17, wherein said memory is an embedded DRAM.

29. An apparatus as claimed in claim 17, wherein said mapping specifying data is stored in a page table entry.

30. An apparatus as claimed in claim 17, wherein said mapping specifying data is stored in a register.

31. An apparatus as claimed in claim 17, wherein said mapping specifying data is stored in an external memory protection unit.

32. An apparatus as claimed in claim 17, wherein said mapping specifying data is stored in said memory controller.

33. An apparatus as claimed in claim 17, wherein at least one of said mappings is programmable.

34. A method of processing data, said method comprising the step of:
accessing a memory having one or more banks, each bank having an array of memory cells including a plurality of rows of memory cells and a plurality of columns of memory cells, including the steps of:
in response to a memory access request specifying a memory address, generating in a memory controller at least a row selecting signal, a column selecting signal to be output to said memory and a chip select signal; wherein
said generating includes applying a programmable mapping according to mapping specifying data between at least some bits of said memory address and respective bits of at least said row selecting signal and said column selecting signal, such that row selecting bits of said memory address that form said row selecting signal and column selecting bits of said memory address that form part of said column selecting signal are selected from said memory address in dependence upon said mapping specifying data, said mapping being different for at least two portions of said memory having a common chip select signal.

35. A method as claimed in claim 34, wherein said generating also includes generating a bank selecting signal.

36. A method as claimed in claim 35, wherein said programmable mapping is such that incrementing said memory address increments in order said column selecting signal, said row selecting signal and said bank selecting signal.

37. A method as claimed in claim 35, wherein said programmable mapping is such that incrementing said memory address increments in order said column selecting signal, said bank selecting signal and said row selecting signal.

38. A method as claimed in claim 35, wherein said programmable mapping is such that incrementing said memory address increments in order a low order portion of said column selecting signal, a low order portion of said row selecting signal, a high order portion of said column selecting signal, a high order portion of said row selecting signal and said bank selecting signal.

39. A method as claimed in claim 38, wherein said low order portion of said column selecting signal and said low order portion of said row selecting signal have respective bit widths matching dimensions of regularly sized blocks of data values stored within said memory.

40. A method as claimed in claim 34, wherein said programmable mapping is programmed by operating system software controlling operation of said apparatus.

41. A method as claimed in claim 34, wherein said programmable mapping is programmed by application software which accesses said memory.

42. A method as claimed in claim 34, wherein said method further comprises monitoring the efficiency of said programmable mapping for accessing said memory.

43. A method as claimed in claim 42, wherein said programmable mapping is altered dependent on said monitoring, such that said efficiency increases.

44. A method as claimed in claim 34, wherein said memory is a SDRAM.

45. A method as claimed in claim 34, wherein said memory is an embedded DRAM.

46. A method as claimed in claim 34, wherein said mapping specifying data is stored in a page table entry within a memory management unit.

47. A method as claimed in claim 34, wherein said mapping specifying data is stored in a configuration register.

48. A method as claimed in claim 34, wherein said mapping specifying data is stored in an memory protection unit.

49. A method as claimed in claim 34, wherein said mapping specifying data is stored in said memory controller.

50. A method of data processing, said method comprising the steps of:
accessing at least one memory device having one or more banks, each bank having an array of memory cells including a plurality of rows of memory cells and a plurality of columns of memory cells; and
exclusively selecting distinct memory devices of said at least one memory device to be an active memory device; including the steps of:
in response to a memory access request to a memory address within said active memory device, generating at least a row selecting signal and a column selecting signal;
mapping between bits of said memory address and bits of said row selecting signal and said column selecting signal; and using different mappings for at least two portions within one of said at least one memory device.

51. A method as claimed in claim 50, wherein said generating also generates a bank selecting signal.

52. A method as claimed in claim 51, wherein at least one of said mappings is such that incrementing said memory address increments in order said column selecting signal, said row selecting signal and said bank selecting signal.

53. A method as claimed in claim 51, wherein at least one of said mappings is such that incrementing said memory address increments in order said column selecting signal, said bank selecting signal and said row selecting signal.

54. A method as claimed in claim 51, wherein at least one of said mappings is such that incrementing said memory address increments in order a low order portion of said column selecting signal, a low order portion of said row selecting signal, a high order portion of said column selecting signal, a high order portion of said row selecting signal and said bank selecting signal.

55. A method as claimed in claim 54, wherein said low order portion of said column selecting signal and said low order portion of said row selecting signal have respective bit widths matching dimensions of regularly sized blocks of data values stored within said memory.

56. A method as claimed in claim 50, wherein said mappings are programmed by operating system software controlling operation of said apparatus.

57. A method as claimed in claim 50, wherein said mappings are programmed by application software which accesses said memory.

58. A method as claimed in claim 50, wherein said method further comprises monitoring the efficiency of said programmable mapping for accessing said memory.

59. A method as claimed in claim 58, wherein said mappings are altered dependent on said monitoring, such that said efficiency increases.

60. A method as claimed in claim 50, wherein said memory is a SDRAM.

61. A method as claimed in claim 50, wherein said memory is an embedded DRAM.

62. A method as claimed in claim 50, wherein said mapping specifying data is stored in a page table entry.

63. A method as claimed in claim 50, wherein said mapping specifying data is stored in a register.

64. A method as claimed in claim 50, wherein said mapping specifying data is stored in an external memory protection unit.

65. A method as claimed in claim 50, wherein said mapping specifying data is stored in said memory controller.

66. A method as claimed in claim 50, wherein at least one of said mappings is programmable.

67. Apparatus for processing data comprising:
memory means for storing data in one or more banks, each bank having an array of memory cells including a plurality of rows of memory cells and a plurality of columns of memory cells; and
controller means for controlling said memory means responsive to a memory access request specifying a memory address to generate at least a row selecting signal, a column selecting signal output to said memory means and a chip select signal; wherein
said controller means includes mapping means responsive to mapping specifying data for applying a programmable mapping between at least some bits of said memory address and respective bits of at least said row selecting signal and said column selecting signal, such that row selecting bits of said memory address that form said row selecting signal and column selecting bits of said memory address that form part of said column selecting signal are selected from said memory address in dependence upon said mapping specifying data, said memory controller using different mappings for at least two portions of said memory having a common chip select signal.

68. Apparatus for data processing comprising:

at least one memory device means for storing data and having one or more banks, each bank having an array of memory cells including a plurality of rows of memory cells and a plurality of columns of memory cells, distinct memory devices of said at least one memory device being mutually exclusively selectable to be an active memory device means; and controller means for controlling coupled to said at least one memory device means and responsive to a memory access request to a memory address within said active memory device means for generating at least a row selecting signal and a column selecting signal; wherein said controller means maps between bits of said memory address and bits of said row selecting signal and said column selecting signal; and said controller means uses different mappings for at least two portions within one of said at least one memory device means.

* * * * *